United States Patent
Wanner et al.

[11] Patent Number: 5,628,081
[45] Date of Patent: May 13, 1997

[54] BRUSH HEAD FOR LARGE MANIPULATORS

[75] Inventors: Martin Wanner, Stuttgart; Dieter Maier, Pliezhausen; Gerhard Birk, Stuttgart, all of Germany

[73] Assignee: Putzmeister-Werk Maschinenfabrik GmbH, Aichtal, Germany

[21] Appl. No.: 411,775

[22] PCT Filed: Sep. 13, 1993

[86] PCT No.: PCT/EP93/02468

§ 371 Date: May 22, 1995

§ 102(e) Date: May 22, 1995

[87] PCT Pub. No.: WO94/07390

PCT Pub. Date: Apr. 14, 1994

[30] Foreign Application Priority Data

Oct. 2, 1992 [DE] Germany .............. 42 33 161.7

[51] Int. Cl.⁶ .............. A47L 15/00; B60S 3/00
[52] U.S. Cl. .............. 15/53.2; 15/53.1; 15/21.1; 15/88.4
[58] Field of Search .............. 15/21.1, 50.3, 15/52.1, 53.2, 53.3, 82, 88.4

[56] References Cited

U.S. PATENT DOCUMENTS 3,439,372  4/1969  Collier .......................... 15/21

FOREIGN PATENT DOCUMENTS 500715   6/1930  Germany.
7821782  12/1978 Germany.
8202818  7/1982  Germany.
4035519  5/1991  Germany.
9205184  8/1992  Germany.

*Primary Examiner*—David Scherbel
*Assistant Examiner*—Terrence R. Till
*Attorney, Agent, or Firm*—Flynn, Thiel, Boutell & Tanis, P.C.

[57] ABSTRACT

The invention relates to a brush head for large manipulators with a brush roller fitted on a motor-driven brush shaft (56) having flexible, centrifugally born bristles (66) and divided into at least two axially separated roller sections (58) and with at least one torque sensor arranged between the brush shaft (56) and the individual roller sections (58). In order to ensure reliable torque detection for the automatic positioning and directing of the brush head, the invention proposes that the brush shaft be also divided into a number of shaft sections (56) corresponding to the number of roller sections (58), the mutually allocated roller and shaft sections be interconnected by axially and radially rigid and circumferentially flexible spacers (60), the torque sensors have a weighing cell (68) projecting radially over the shaft section (56) concerned towards the roller section and a flexible tensioner (70) extending substantially tangentially between the weighing cell and the inside of the relevant roller section (58) against the direction of rotation, and that the brush sections (48', 48'', 48''', 48^{IV}) made up of the shaft sections (56) and roller sections (58) be mutually tensioned via a tension rod and connected to the frontal motor drive system.

19 Claims, 4 Drawing Sheets

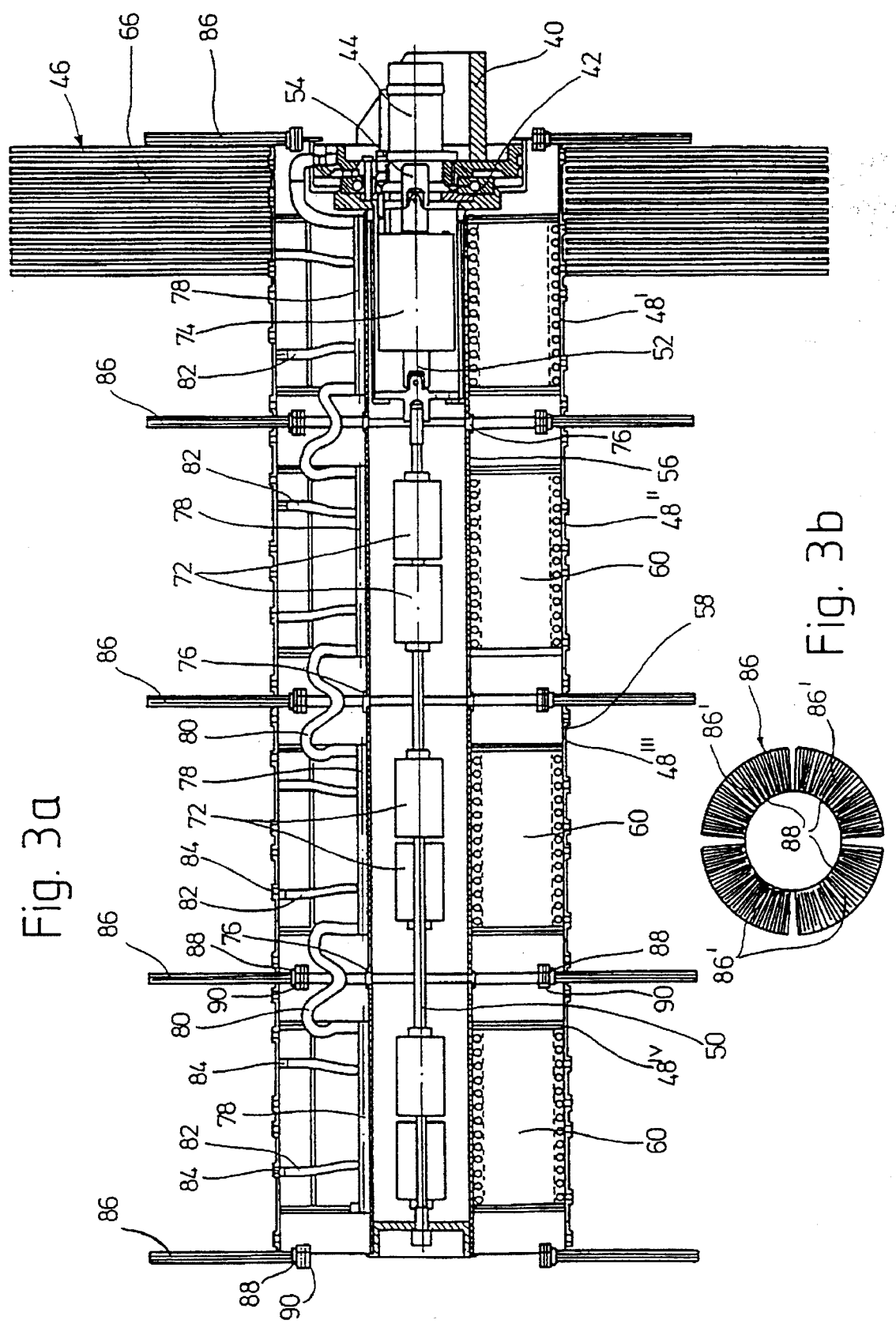

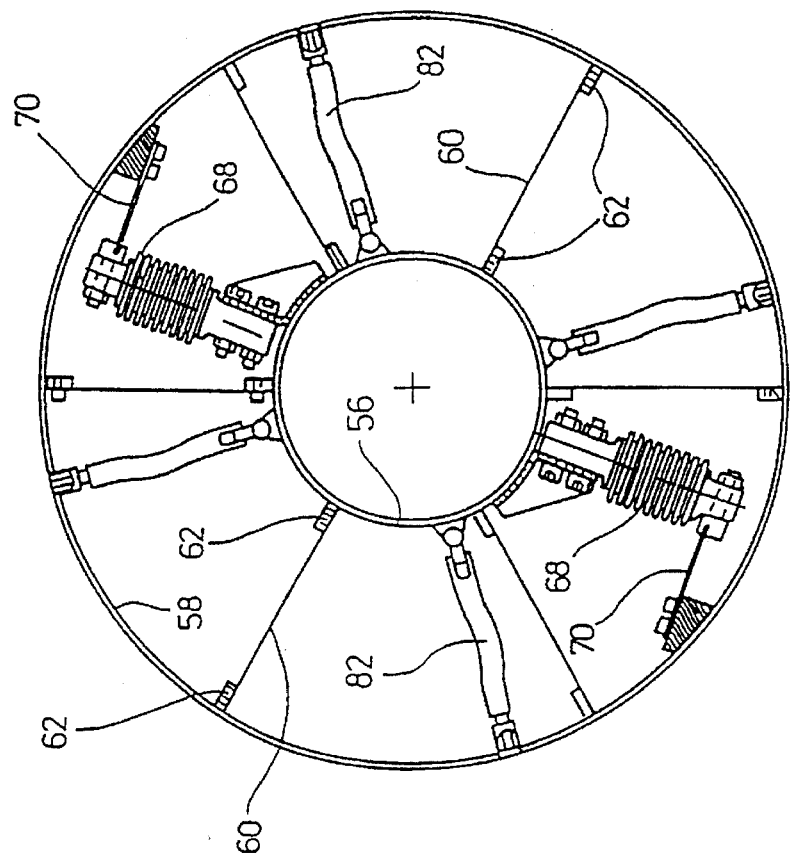
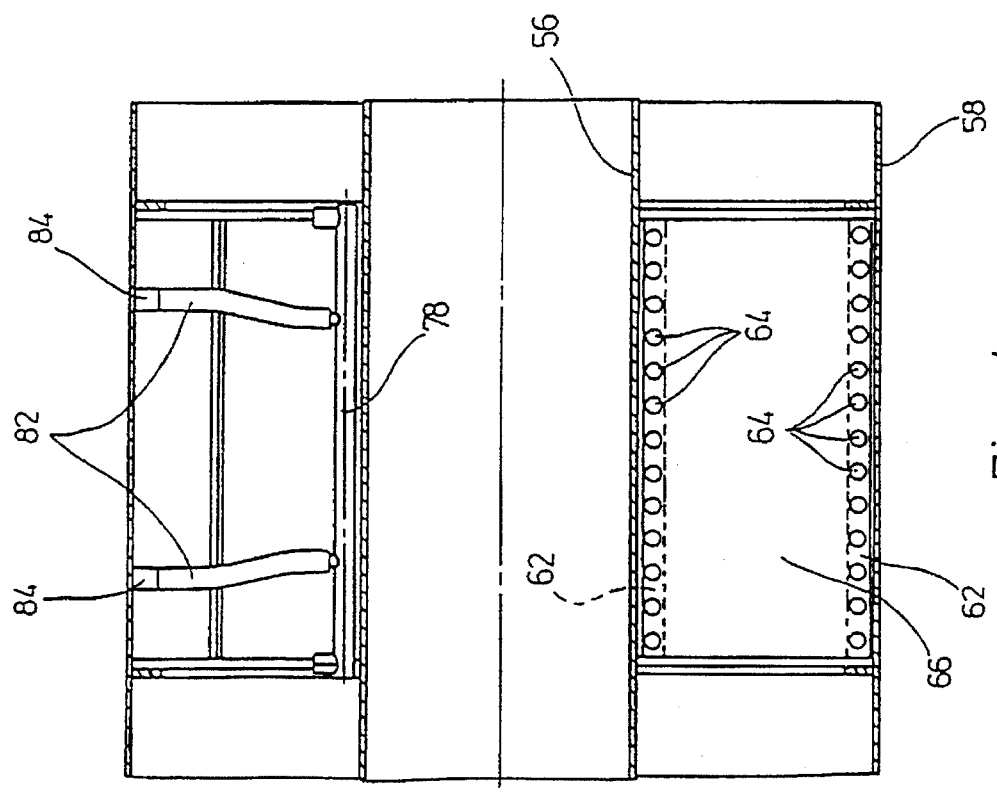
Fig. 4b
Fig. 4a

BRUSH HEAD FOR LARGE MANIPULATORS

FIELD OF THE INVENTION

The invention relates to a brush head for large manipulators, having a carrier, which can be coupled to an extension arm and/or a multiple joint of the large manipulator, having a brush roller, which is disposed on the carrier on a brush shaft which said brush shaft is motor-driven in a predefined direction of rotation, includes centrifugally supported, flexurally limp bristles, acts with its bristles against a surface to be cleaned and is divided up into at least two axially mutually separated roller sections, and having, in each case, at least one torque pickup disposed between the brush shaft and the individual roller sections.

BACKGROUND OF THE INVENTION

In DE-A1-40 35 519 of the Applicant, it has already been proposed to equip a large manipulator with a remote-controllable washing brush. The known large manipulator includes an articulated pole which is constructed of a plurality of extension arms which are mutually pivotable at their ends. The basic extension arm of which is mounted rotatably about a vertical axis on a bearing pedestal disposed on an underframe and the end extension arm includes a multiple joint which can be fitted with the brush head. The multiple joint can be actuated there in three rotary degrees of freedom and additionally exhibits a translatory degree of freedom created by a telescopic axle. The brush head contains two motor-driven brush rollers, which include, in the rotating state, a frustoconical contacting surface and face each other at their front ends of larger diameter and which enclose a variable angle between their rotational axes and are disposed on the carrier such that they can be mutually adjusted.

From this publication, it is also known to assemble the brush rollers and their supporting bodies from three roller sections, which can be axially separated from one another and are mounted on the brush shaft by means of mutually independent torque pickups. The roller sections enable an adjustable alignment of the brush roller, relative to a surface to be worked, and according to the difference in the torques measured between the outer roller sections during the cleaning operation. It has been shown in practice, however, that a large number of cleaning tasks, for example in the washing of aircraft, cannot be achieved using a double-roller brush head, primarily due to a lack of degrees of motional freedom. Apart from this, it has proven very difficult to produce a reliably operating torque pickup in the known brush rollers.

Based upon the above, the object of the invention is to develop a brush head for large manipulators of the type defined in the introduction, which, in the operating state, enables the torque to be reliably recorded for automatic guidance of the brush head on the surface to be cleaned.

In order to achieve this object, it is proposed according to the invention that the brush shaft also be divided up into a number of shaft sections corresponding to the number of roller sections, that the mutually assigned, mutually concentric roller and shaft sections are interconnected by radial spacers, which are arranged spaced apart about the periphery, are very rigid in the axial and radial directions and are yielding in the peripheral direction, that the torque pickups include a weighing cell, which protrudes radially over the respective shaft section in the direction of the roller section, and a tensioning member, which extends essentially tangentially, counter to the direction of rotation, between the weighing cell and the inner side of the associated roller section, and that the brush rings, which are made up, respectively, of a shaft section and roller section, in creating the brush roller, are axially braced one against the other in the region of the shaft sections and are connected to the motor drive located on the carrier side.

SUMMARY OF THE INVENTION

The weighing cells preferably contain a wire strain gauge, which emits a measuring signal which is dependent on the force applied. Each weighing cell is therefore assigned a measuring transducer, which is preferably disposed inside the shaft section of hollow design and is connected to an external electronic evaluation unit, the measuring lines being able to be led outward via a slip ring. The application of force into the weighing cell is orientated and configured such that only tensile forces counter to the direction of rotation of the washing brush are transmitted into the weighing cell. The tensile forces which act upon the weighing cell via the traction member and the measuring signals which are triggered thereby are roughly proportional to the immersion depth of the bristles, thereby enabling the measuring signals for the positioning and orientation of the washing brush to be evaluated by control-engineering techniques.

For reasons of redundancy, there can respectively be provided in the brush rings two (or even more than two) mutually diametrically opposed weighing cells, which—as long as they are both working jointly—make it possible to examine the accuracy of the measurement findings, and which, if a weighing cell should fail, ensure emergency operation up to the next maintenance interval. The operation of the weighing cells is monitored by means of an on-board computer. The weighing cells are located in a damp and chemically aggressive environment (washing fluid with additives) and therefore include a hermetically sealed housing.

A further advantageous embodiment of the invention provides that the shaft and roller sections include radially mutually facing, axially aligned screwing bars for fastening the spacers that are formed of flat material, especially of flexible sheet metal. The brush rings are preferably interconnected by a drawbar passing through the shaft sections of hollow design and are connected to the motor drive located on the carrier side. In addition, the brush shaft is advantageously mounted on one side in a pivot bearing located on the carrier side, while the drawbar is connected, preferably by a Cardan shaft, to the motor drive with the slip ring for the measuring lines preferably being able to be disposed on the Cardan shaft.

In order to ensure simple maintenance in case of problems, all measuring transducers are disposed on a supporting structure which passes through the shaft sections of hollow design and is detachably fastened there and preferably encloses the drawbar in the manner of a tube.

It has further proved to be very important that there be no or only slight frictional connection between the individual roller sections. These are kept at a distance apart by intermediate rings in the region of the shaft sections and can be twisted relative to one another in the peripheral direction.

Since the washing brushes rotate at speeds of around 150 rpm, relatively large imbalances can arise with respect to large diameter brush, roller, or shaft. These imbalances between sections can be roughly compensated for by the various sections allowing for reciprocal twisting between sections due to their own imbalances and thus do not exert a reaction force upon the manipulator arm.

The washing fluid preferably is supplied via fluid lines, which are guided along the shaft sections and from which, spray lines are branched off that are directed radially to the roller sections and to the brush threads. The fluid lines are interconnected between the individual shaft sections by flexible hoses so as to preclude the aforementioned frictional connection between the shaft sections.

The measuring signals of the torque pickups must be processed for the computer control system such that they are free from disturbances. Disturbances can herein be induced, for example, by the drive motor, which is preferably configured as a hydraulic motor, and by imbalances caused by uneven wearing of the bristles or by mechanical deformations within the brush roller. In order to eliminate the influence of these disturbances, it is proposed, according to the invention, that the measuring signals be processed by a low-pass filter tuned to the speed of advancement of the brush head. Frequencies resulting from the imbalances of the brush head and from symptoms of wearing are in the order of magnitude of around 2.5 Hz, equivalent to the rotational speed of the brush head, while the disturbances arising from the motor region measure around 80 Hz. It is therefore proposed, according to the invention, to design the low-pass filter with a limit frequency of 1.5 to 3 Hz.

According to the invention, the division of the brush roller into a plurality of sections means that, by measuring the different immersion depth (torque or torsion measurement), the adaption axes of the brush head are able to be tracked in terms of their position and orientation. In principle, two sections would be sufficient for this purpose. For redundancy reasons, however, at least three, preferably four roller sections are provided.

In order to prevent damage to the surface to be cleaned, there has to be an ability in critical situations for an emergency cut-out. In particular, there must be a guarantee that, at a predefined penetration depth, a cut-out will be effected such that even some after-running of the brush head in the radial direction is able to be checked. In order to achieve this, the roller sections respectively include at least one contact sensor disposed in a recessed arrangement within the bristle arrangement for triggering an emergency off-signal. The contact sensor can herein include a sensing bristle carrier, which is disposed in a radial guide within the brush roller and has a tuft of elastic sensing bristles, and a switching member, which can be actuated by a radial motion of the sensing bristle carrier wherein the sensing bristles are shorter than, preferably about half as long as the flexurally limp bristles of the brush roller. In the operating state, the sensing bristle carrier is pulled outward due to centrifugal force. The switching member only responds if the sensing bristle carrier is forced radially inward, whereby the centrifugal force is surmounted. This is the case where, as the brush roller is penetrated, a radial force is exerted from without upon the sensing bristles and hence upon the sensing bristle carrier. Advantageously, at least three, preferably four sensing bristle carriers are respectively provided, which are arranged spaced apart about the periphery, are formed in a segment-like configuration and combine to form a ring. The majority of the sensing bristle carriers present have, in the first place, a redundancy function. In the second place, radial and axial resolution are thereby obtained during fault recognition.

BRIEF DESCRIPTION OF THE DRAWINGS

The invention is explained in greater detail below with reference to an illustrative embodiment represented diagrammatically in the drawing, in which:

FIG. 3a shows a sectional view through a brush head in an enlarged representation;

FIG. 3b shows a top view of a sensing bristle ring of the brush head according to FIG. 3a;

FIG. 4a shows a longitudinal sectional view through a roller section;

FIG. 4b shows a front view of a roller section.

DETAILED DESCRIPTION

Figure 1:
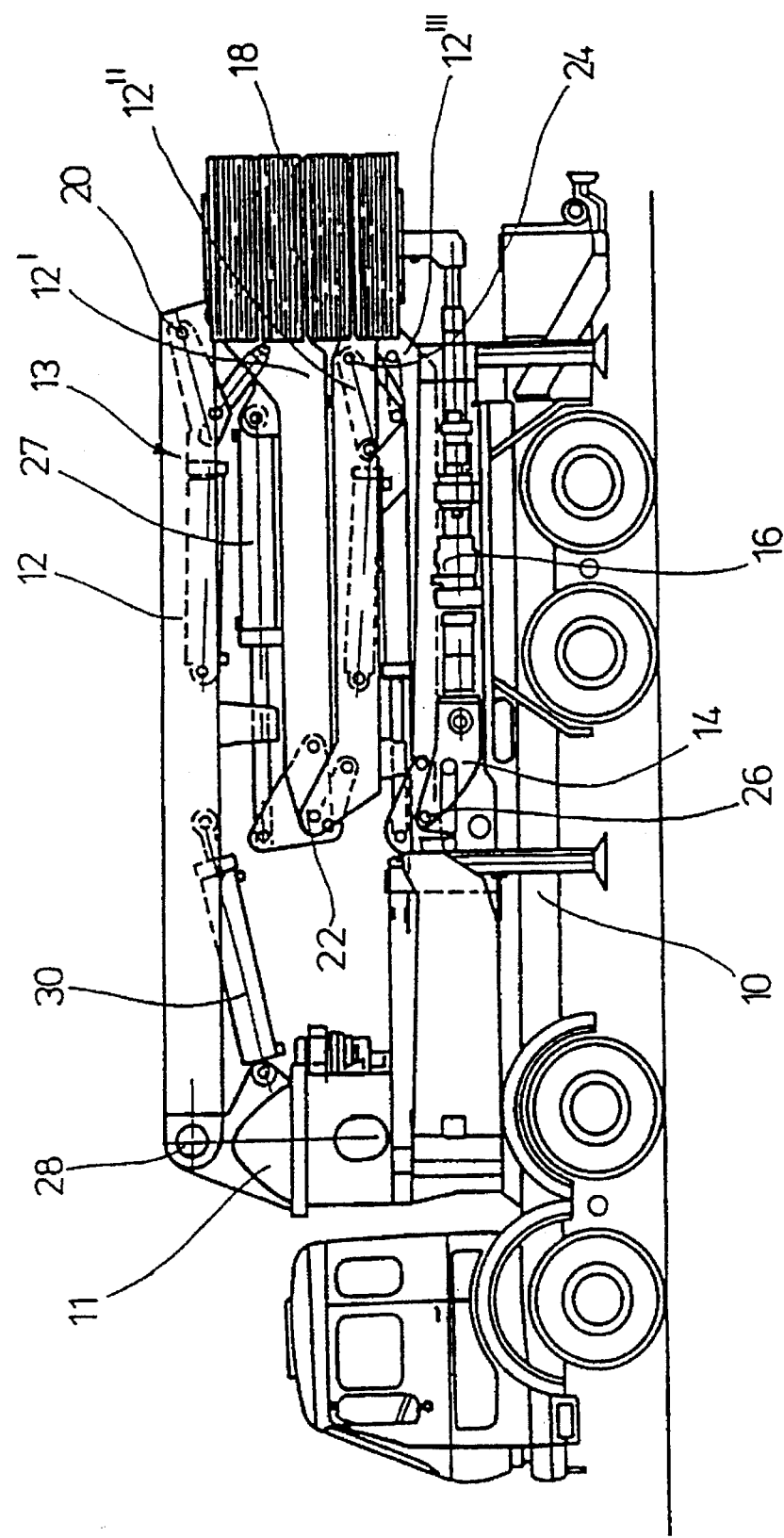
FIG. 1 shows a side view of a large mobile manipulator having a six-axis multiple joint and a brush head, which is in a folded-in setting.

The mobile large manipulator which is represented in FIG. 1 essentially comprises an articulated pole 13, which is mounted on a pivot bearing pedestal 11 of a motor-driven underframe 10 such that it is rotatable with its basic extension arm 12 about a vertical axis, a multiple joint 16, which is disposed on the end extension arm 14 of the articulated pole 13, and a brush head 18, which is detachably fastened to the free end of the multiple joint. The five extension arms 12, 12', 12", 12'" and 14 of the articulated pole 13 are interconnected at their mutually facing ends, at joints 20, 22, 24, 26, such that they are limitedly pivotable about horizontal axes. The pivoting is effected by means of hydraulic cylinders 27, which are disposed at suitable points between the extension arms. The basic extension arm 12 is mounted on a horizontal bearing 28 such that it is pivotable, by means of a hydraulic drive 30, on the pivot bearing pedestal 11. In the setting shown in FIG. 1, the extension arms of the articulated pole are represented in their collapsed state for transportation purposes.

This arrangement makes it possible, with the brush head, to trace optional surface contours within the plane clamped by the extension arms. With the aid of the motor-adjustable multiple joint 16, it is additionally possible to move the brush head 18 about a plurality of rotational and thrust axes, in six degrees of freedom relative to the end extension arm.

Figure 2:
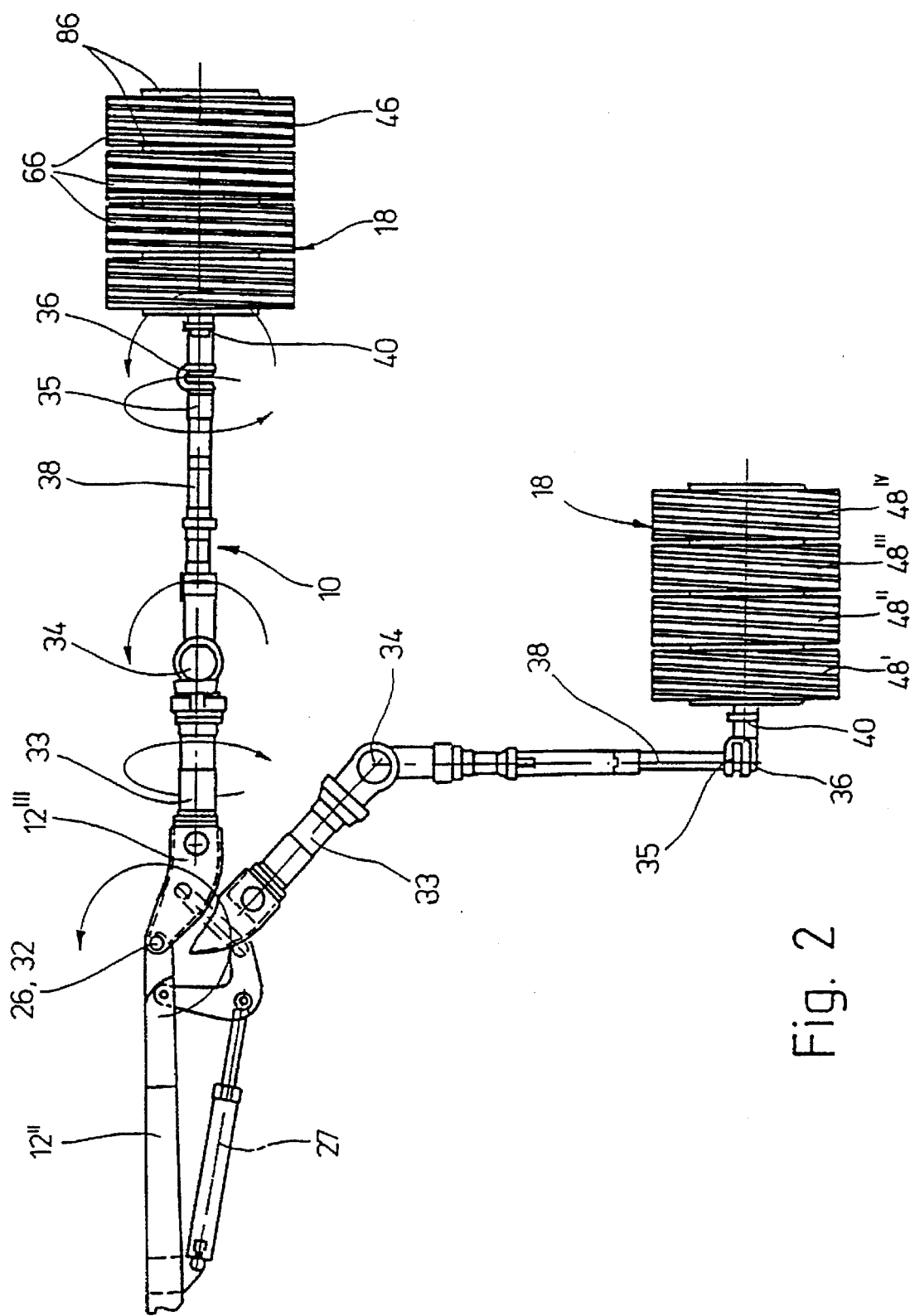
FIG. 2 shows a side view of the multiple joint having the brush head, in two working settings.

As can be seen from FIG. 2, the multiple joint 16 essentially comprises five pivot joints 32, 33, 34, 35, 36, which have a respective adjustment drive (not represented) disposed within the pivot joint, and a hydraulically adjustable sliding joint 38, which is disposed on the brush head side. The axes 33, 34, 35 herein have the task of orientating the washing brush in terms of "rolling", "pitching" and "yawing", while, with the telescopic axle 38 and the pivot axle 36, the washing brush is guided in a regulated manner at a constant clearance along the surface to be cleaned. Precise guidance is provided by using the torque signals which are explained below.

The brush head 18 includes a carrier 40, which is detachably fastened to the pivot joint 36 of the multiple joint 16 and is connected by a pivot bearing 42 to a washing brush 46 that is driven by a hydraulic motor 44. The washing brush 46 comprises, for its part, four brush sections 48', 48", 48'", $48^{IV}$, which are interconnected by a drawbar 50 and are connected, by a Cardan shaft 52, to the drive shaft 54 of the hydraulic motor 44. The brush sections are respectively constructed of an inner, hollow-cylindrical shaft section 56 and an outer roller section 58, which is disposed concentrically thereto. The sections are interconnected by a plurality of thin-walled, sheet-metal spacers 60, which are disposed an angular distance apart and extend radially and axially. The spacers 60 are fastened by rows of screws 64 to radially mutually facing web bars 62 of the shaft sections 56 and of the roller sections 58. The thin-walled spacers 60 form, in the axial and radial directions, an extremely rigid connection and, in the peripheral direction, a soft connection between the roller and shaft sections. The roller and shaft sections are thereby able to be reciprocally twisted in the peripheral direction in a defined manner.

On the outer side of the shaft sections 56, there is respectively disposed a brush crown 66, which extends over the entire length and is formed of flexurally limp bristles, which point radially outward under the influence of centrifugal force as the washing brush rotates.

On the periphery of the shaft sections 56 there are rigidly disposed two mutually diametrically opposed weighing cells 68, which are essentially connected tangentially to the associated roller section by a flexurally limp tensioning member 70, which is aligned counter to the direction of rotation of the washing brush. The weighing cells contain a wire strain gauge (not illustrated), which, under the influence of a force acting upon the tensioning member, emits a force-proportional measuring signal. The measuring signals lying within the millivolt range are enhanced in measuring transducers 72, which are disposed inside the shaft sections 56, and are forwarded in this form, via sliding contacts 74, to an external electronic evaluation unit. The brush sections 48', 48", 48'", 48$^{IV}$, which are interconnected by drawbars, are mutually supported with their shaft sections 56 against intermediate rings such that they are able to be reciprocally twisted so as to equalize imbalances, for example. The shaft sections 56 thus form a continuous brush shaft, while the roller sections 58 with their brush crowns 66 combine to form a brush roller.

The washing fluid is distributed via fluid lines 78, which extend along the shaft sections 58 parallel to the axis and which are interconnected in pairs between the shaft sections 56 by flexible hose pieces 80 and are connected to an outer supply line. Moreover, branching off from the fluid lines 78, are radial spray lines 82, which emerge, via spray nozzles 84, into the brush crown 66 and supply this with washing fluid from the inside.

At the front ends of the washing brush 46 and in the dividing region between two roller sections 58, there is respectively disposed a sensing bristle ring 86, which is divided up into four segments 86' configured as a contact sensor. The sensing bristles are shorter than the bristles 104 of the brush crown 66. They are connected, segment by segment, to a sensing bristle carrier 88, which is guided in a radial guide 90 in the region of the brush roller 58. Under the influence of the centrifugal force of the rotating washing brush 46, the sensing bristle carriers 88 together with their sensing bristles are pulled outward in the radial guide 90. Under the influence of a radial force acting from without upon the sensing bristles whereby the centrifugal force is surmounted, the bristle carriers 88 are able to be displaced segment by segment against a switching member (not illustrated) so as to trigger, an emergency off-signal.

By way of summary, the following can be stated. The invention relates to a brush head for large manipulators having a brush roller, which is disposed on a motor-driven brush shaft 56, includes centrifugally supported, flexurally limp bristles 66 and is divided up to display at least two axially mutually separated roller sections 58, and having, in each case, at least one torque pickup disposed between the brush shaft 56 and the individual roller sections 58. In order to ensure that the torque is reliably recorded for the automatic positioning and orientation of the brush head it is proposed according to the invention that the brush shaft also is divided up into a number of shaft sections 56 corresponding to the number of roller sections 58, that the mutually assigned roller and shaft sections are interconnected by radial spacers 60, which are rigid in the axial and radial directions and are yielding in the peripheral direction, that the torque pickups include a weighing cell 68, which protrudes radially over the respective shaft section 56 in the direction of the roller section, and a flexurally limp tensioning member 70, which extends essentially tangentially, counter to the direction of rotation between the weighing cell and the inner side of the associated roller section 58, and that the brush sections 48', 48", 48'", 48$^{IV}$, which are made up of a shaft section 56 and roller section 58, in creating the washing brush 46, are axially braced one against the other by means of a drawbar and are connected to the motor drive located on the front carrier side.

The invention claimed is:

1. A brush head for a large manipulator, comprising: a multi-directional joint on said large manipulator, a carrier coupled to said multi-directional joint; a brush shaft rotatably supported on said carrier, said brush shaft being motor-driven in a predefined direction of rotation, and said brush shaft being divided into plural shaft sections; a brush roller relatively rotatably supported on said brush shaft and being rotatably driven by and with said brush shaft, said brush roller being divided into at least two axially separate roller sections each having centrifugally responsive, flexurally limp bristles thereon adapted to contact against a surface to be cleaned, said bristles on each said brush roller defining a brush section, a number of said plural shaft sections corresponding to the number of said roller sections; each said brush section being defined by a concentric arrangement of a single said shaft section and a single said roller section, said brush sections including bracing means for axially bracing one said brush section against the other, said bracing means being positioned adjacent said shaft sections; at least one torque pickup means being disposed between respective radially spaced said shaft sections and said roller sections, said torque pickup means including a weighing cell protruding radially outwardly from said shaft sections toward said roller sections, and a tensioning member extending between said weighing cell and an inner side of one associated said roller section; and radial spacers arranged spaced apart in a circumferential direction between said shaft sections and said roller sections, said radial spacers being rigid in an axial and a radial direction and are yielding in the circumferential direction.

2. The brush head as claimed in claim 1, wherein in said brush sections there are respectively disposed two mutually diametrically opposed weighing cells.

3. The brush head as claimed in claim 1, wherein said tensioning members acting upon said weighing cells are flexurally limp.

4. The brush head as claimed in claim 1, further comprising radially spaced and opposed, axially aligned web bars for fastening said radial spacers thereto, said web bars being oriented between said roller sections and said shaft sections.

5. The brush head as claimed in claim 1, wherein said shaft sections are hollow and have a signal transducer positioned within an interior thereof, wherein each weighing cell is electrically connected to said signal transducer, and wherein said signal transducer is electrically connected to an external electronic evaluation unit.

6. The brush head as claimed in claim 5, wherein said brush sections are interconnected by a drawbar, and wherein said signal transducers are positioned on a supporting structure which passes through said shaft sections, said supporting structure being detachably fastened within the interior of said shaft sections and has a tube-like configuration enclosing said drawbar.

7. The brush head as claimed in claim 1, wherein said shaft sections are hollow, and wherein said brush sections are interconnected by a drawbar passing through said hollow shaft sections, and further comprising motor drive means for rotatably driving said drawbar.

8. The brush head as claimed in claim 7, wherein said shaft section located nearest said motor drive means has one end mounted on a pivot bearing positioned on said carrier, and wherein said motor drive means includes a Cardan shaft, said Cardan shaft being connected between to the motor drive means and said drawbar.

9. The brush head as claimed in claim 8, wherein said shaft sections are hollow and have a signal transducer positioned within an interior thereof, and wherein a slip ring means is positioned on said Cardan shaft for providing an electrical connection to said signal transducers.

10. The brush head as claimed in claim 1, wherein said shaft sections are interconnected by axial intermediate rings, such that each said shaft section can reciprocally twist in the circumferential direction relative to an adjacent said shaft section.

11. The brush head as claimed claim 1, further comprising fluid lines for transporting washing fluid positioned along said shaft sections, spray lines branching off from said fluid lines radially to said roller sections, and flexible hose pieces extending between mutually adjacent shaft sections for interconnecting said fluid lines.

12. The brush head as claimed in claim 1, wherein said brush sections include at least three brush sections interconnected at said shaft sections.

13. The brush head as claimed in claim 1, wherein said roller sections respectively include at least one contact sensor means disposed in a recessed arrangement within said bristles for triggering an emergency off-signal.

14. The brush head as claimed in claim 13, wherein said contact sensor has a sensing bristle carrier disposed in a radial guide near said roller sections and is fitted with a tuft of rigidly elastic sensing bristles, and a switching member actuatable by a radial motion of said sensing bristle carrier, said sensing bristles being shorter than said flexurally limp bristles.

15. The brush head according to claim 14, wherein said sensing bristles are about half as long as said flexurally limp bristles.

16. The brush head as claimed in claim 14, wherein at least three said sensing bristle carriers are respectively provided, which are arranged spaced apart about the periphery of said brush section, and are formed in a segment-like configuration and combine to form a ring.

17. The brush head as claimed in claim 1, wherein said brush sections and said bristles define a washing brush, and wherein said multi-directional joint has three orthogonally related pivot axes to enable an orientation of said washing brush relatively to a geometrically defined surface to be cleaned, and a telescopic axle and a further pivot axle for regulated guidance of said washing brush at a constant clearance along the surface to be cleaned regulated by the measuring signals emitted by said torque pickups.

18. The brush head according to claim 1, wherein said radial spacers are formed from thin-walled sheet metal.

19. A brush head for a large manipulator, comprising: an extension arm on said large manipulator, a carrier coupled to said extension arm of the large manipulator; a brush shaft rotatably supported on said carrier, said brush shaft being motor-driven in a predefined direction of rotation, and said brush shaft being divided into plural shaft sections; a brush roller relatively rotatably supported on said brush shaft and being rotatably driven by and with said brush shaft, said brush roller being divided into at least two axially separate roller sections each having centrifugally responsive, flexurally limp bristles thereon adapted to contact against a surface to be cleaned, said bristles on each said brush roller defining a brush section, a number of said plural shaft sections corresponding to the number of roller sections; each said brush section being defined by a concentric arrangement of a single said shaft section and a single said roller section, said brush sections including bracing means for axially bracing one said brush section against the other, said bracing means being positioned adjacent said shaft sections; at least one torque pickup means being disposed between respective radially spaced said shaft sections and said roller sections, said torque pickup means include a weighing cell protruding radially outwardly from said shaft sections toward said roller sections, and a tensioning member extending between said weighing cell and an inner side of an associated said roller section; and radial spacers arranged spaced apart in a circumferential direction between said shaft sections and said roller sections, said radial spacers being rigid in an axial and a radial direction and are yielding in the circumferential direction.

* * * * *